United States Patent
Valeri et al.

(10) Patent No.: US 10,957,189 B1
(45) Date of Patent: Mar. 23, 2021

(54) AUTOMATIC VEHICLE ALERT AND REPORTING SYSTEMS AND METHODS

(71) Applicant: GM GLOBAL TECHNOLOGY OPERATIONS LLC, Detroit, MI (US)

(72) Inventors: Frank C. Valeri, Novi, MI (US); Ian R. Singer, Macomb, MI (US); Richard A. Close, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/564,277

(22) Filed: Sep. 9, 2019

(51) Int. Cl.
| | |
|---|---|
| G08G 1/01 | (2006.01) |
| G08G 1/017 | (2006.01) |
| H04W 4/44 | (2018.01) |
| G06K 9/00 | (2006.01) |
| H04W 4/46 | (2018.01) |
| G08G 1/0965 | (2006.01) |
| B60Q 9/00 | (2006.01) |
| B60R 11/04 | (2006.01) |
| H04N 5/225 | (2006.01) |
| G01C 21/34 | (2006.01) |

(52) U.S. Cl.
CPC ............. *G08G 1/0175* (2013.01); *B60Q 9/00* (2013.01); *B60R 11/04* (2013.01); *G06K 9/00791* (2013.01); *G08G 1/0965* (2013.01); *H04N 5/2253* (2013.01); *H04W 4/44* (2018.02); *H04W 4/46* (2018.02); *G01C 21/3461* (2013.01); *G06K 2209/01* (2013.01); *G06K 2209/15* (2013.01)

(58) Field of Classification Search
CPC ........ G08G 1/0175; H04W 4/46; H04W 4/44; B60Q 9/00

USPC .......................................................... 340/902
See application file for complete search history.

(56) References Cited

U.S. PATENT DOCUMENTS

| | | | |
|---|---|---|---|
| 9,646,428 B1* | 5/2017 | Konrardy | G08G 1/147 |
| 2016/0180604 A1* | 6/2016 | Wilson | G07B 15/063 705/4 |
| 2017/0032673 A1* | 2/2017 | Scofield | G08G 1/0962 |
| 2018/0075309 A1* | 3/2018 | Sathyanarayana | G06N 7/005 |
| 2018/0208195 A1* | 7/2018 | Hutcheson | G05D 1/0088 |
| 2019/0057315 A1* | 2/2019 | Yi | G06K 9/3258 |
| 2019/0122460 A1* | 4/2019 | Reyes | G08G 1/166 |
| 2020/0066146 A1* | 2/2020 | Ichikawa | G06K 9/00771 |
| 2020/0074211 A1* | 3/2020 | Georgis | G06K 9/3258 |
| 2020/0108869 A1* | 4/2020 | You | H04W 4/46 |

* cited by examiner

*Primary Examiner* — Omar Casillashernandez

(57) ABSTRACT

A system of a vehicle includes: a camera configured to capture images within a predetermined field of view at least one of: in front, behind, and beside the vehicle; a license plate module configured to determine license plate information of a license plate attached to another vehicle; an event module configured to: based on at least one of the images, determine whether the other vehicle performed a predetermined type of driving maneuver; and generate an indicator in response to the other vehicle performing the predetermined type of driving maneuver; a reporting module configured to, in response to the generation of the indicator, generate a report including: the license plate information of the license plate attached to the other vehicle; and the predetermined type of driving maneuver performed by the other vehicle; and a communication module configured to wirelessly transmit the report to a server via at least one antenna.

19 Claims, 12 Drawing Sheets

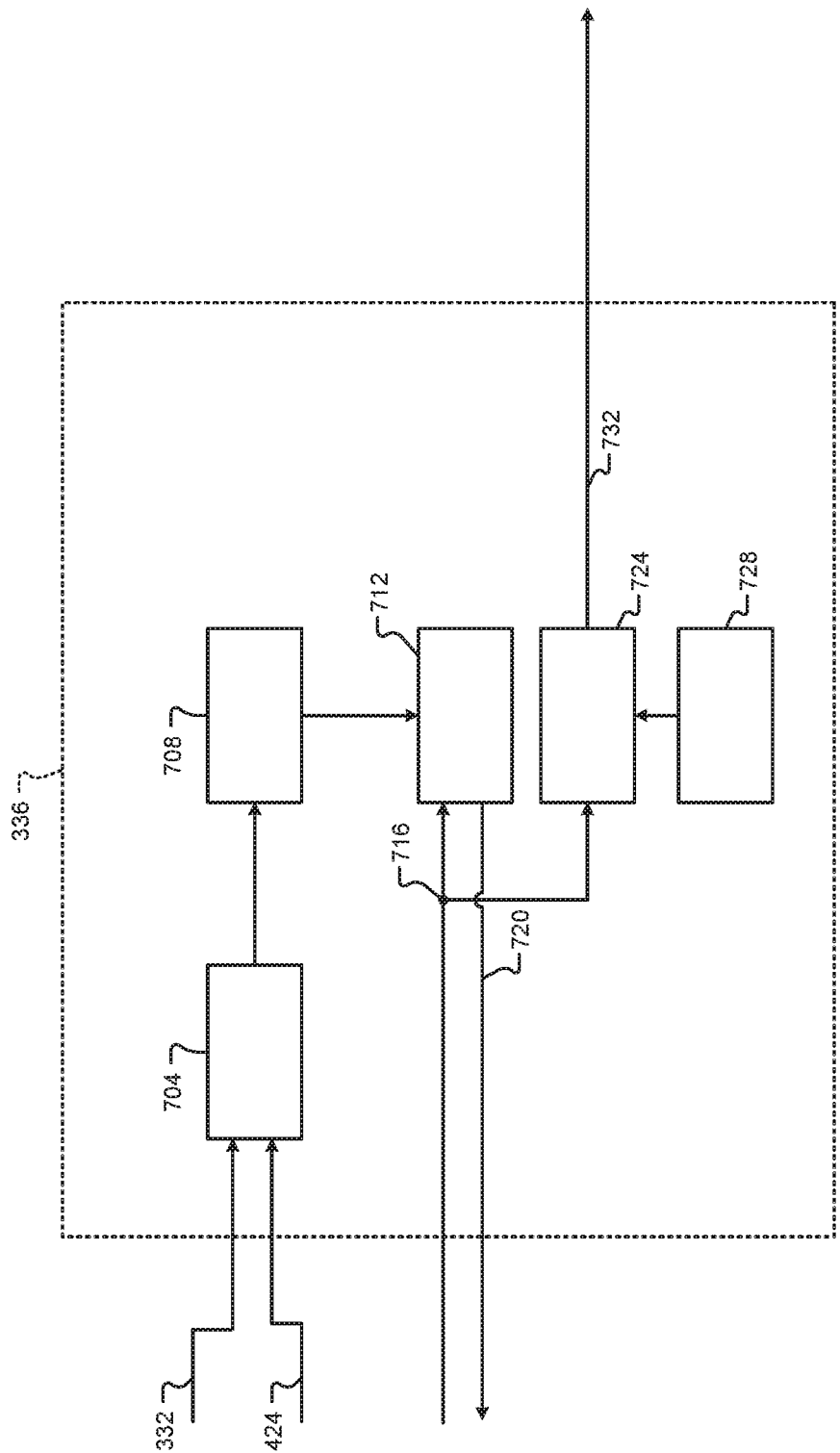

AUTOMATIC VEHICLE ALERT AND REPORTING SYSTEMS AND METHODS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicles and more particularly to systems and methods for reporting vehicle actions and alerting vehicle users and/or adjusting vehicle operation based on behavior of surrounding vehicles.

Vehicles include one or more torque producing devices, such as an internal combustion engine and/or an electric motor. A passenger of a vehicle rides within a passenger cabin (or passenger compartment) of the vehicle.

Vehicles may include one or more different type of sensors that sense vehicle surroundings. One example of a sensor that senses vehicle surroundings is a camera configured to capture images of the vehicle surroundings. Examples of such cameras include forward facing cameras, rear facing cameras, and side facing cameras. Another example of a sensor that senses vehicle surroundings includes a radar sensor configured to sense vehicle surroundings. Other examples of sensors that sense vehicle surroundings include sonar sensors and light detection and ranging (LIDAR) sensors configured to sense vehicle surroundings.

SUMMARY

In a feature, a system of a vehicle includes: a camera configured to capture images within a predetermined field of view at least one of: in front of the vehicle; behind the vehicle; and beside the vehicle; a license plate module configured to determine license plate information of a license plate attached to another vehicle; an event module configured to: based on at least one of the images, determine whether the other vehicle performed a predetermined type of driving maneuver; and generate an indicator in response to the other vehicle performing the predetermined type of driving maneuver; a reporting module configured to, in response to the generation of the indicator, generate a report including: the license plate information of the license plate attached to the other vehicle; and the predetermined type of driving maneuver performed by the other vehicle; and a communication module configured to wirelessly transmit the report to a server via at least one antenna.

In further features, the server includes a risk module configured to: receive the report; based on the predetermined type of driving maneuver performed by the other vehicle, update risk information associated with the license plate information of the license plate attached to the other vehicle and stored in a risk database; and determine a risk score associated with the license plate information of the license plate attached to the other vehicle based on the updated risk information; and store the risk score in association with the license plate information in the risk database.

In further features: a risk obtaining module is configured to generate a request including the license plate information of the license plate attached to the other vehicle, where the communication module is configured to wirelessly transmit the request to the server via the at least one antenna, where the server further includes a response module configured to: based on the license plate information of the license plate attached to the other vehicle included in the request, determine the risk score associated with the license plate information stored in the risk database; and wirelessly communicate a response including the risk score of the other vehicle to the vehicle.

In further features, an infotainment module is configured to selectively adjust information displayed on a display of the vehicle based on the risk score of the other vehicle.

In further features, an engine control module configured to selectively adjust torque output of an internal combustion engine based on the risk score of the other vehicle.

In further features, a power inverter module configured to control torque output of an electric motor based on the risk score of the other vehicle.

In further features, a steering control module configured to selectively adjust steering of the vehicle based on the risk score of the other vehicle.

In further features, a braking control module configured to selectively adjust braking of the vehicle based on the risk score of the other vehicle.

In further features, an infotainment module configured to select a route for the vehicle based on the risk score of the other vehicle.

In further features: the request further includes a location of the vehicle obtained from a global positioning system of the vehicle; and the server further includes a reporting module configured to: from the request, obtain the license plate information of the license plate attached to the other vehicle; determine whether the license plate information of the license plate attached to the other vehicle is included in a reported vehicle database; and in response to determining that the license plate information of the license plate attached to the other vehicle is included in the reported vehicle database, transmit a report to a governmental regulatory body, the report including the location of the vehicle and the license plate information of the license plate attached to the other vehicle.

In further features a mobile device is configured to: in response to user input to the mobile device, generate a second report including: the license plate information of the license plate attached to the other vehicle; and a predetermined type of second driving maneuver performed by the other vehicle; and wirelessly transmit the second report to the server.

In further features, the risk module is further configured to: receive the second report; based on the predetermined type of second driving maneuver performed by the other vehicle, update the risk information associated with the license plate information of the license plate attached to the other vehicle and stored in the risk database; determine the risk score associated with the license plate information of the license plate attached to the other vehicle based on the updated risk information; and store the risk score in association with the license plate information in the risk database.

In further features, the reporting module is further configured to, in response to user input to an infotainment module of the vehicle, generate a second report including: the license plate information of the license plate attached to the other vehicle; and a predetermined type of second driving maneuver performed by the other vehicle; and the communication module is further configured to wirelessly transmit the second report to the server via at least one antenna.

In further features, the license plate module is configured to determine the license plate information using optical character recognition (OCR) based on at least one of the images.

In a feature, a system of a vehicle includes: a camera configured to capture images within a predetermined field of view at least one of: in front of the vehicle; behind the vehicle; and beside the vehicle; a license plate module configured to determine license plate information of a license plate attached to another vehicle; a risk obtaining module configured to generate a request including the license plate information of the license plate attached to the other vehicle; and a communication module configured to: wirelessly transmit the request to a server via at least one antenna; and wirelessly receive a response from the server via at least one antenna, wherein the response includes a risk score of the other vehicle.

In further features, the system includes at least one of: an infotainment module configured to selectively adjust information displayed on a display of the vehicle based on the risk score of the other vehicle; an engine control module configured to selectively adjust torque output of an internal combustion engine based on the risk score of the other vehicle; a power inverter module configured to control torque output of an electric motor based on the risk score of the other vehicle; a steering control module configured to selectively adjust steering of the vehicle based on the risk score of the other vehicle; a braking control module configured to selectively adjust braking of the vehicle based on the risk score of the other vehicle; and an infotainment module configured to select a route for the vehicle based on the risk score of the other vehicle.

In a feature, a server includes: a risk database; and a risk module configured to: wirelessly receive a report from a first vehicle, the report including: license plate information of a license plate attached to a second vehicle; and a predetermined type of driving maneuver performed by the second vehicle; based on the predetermined type of driving maneuver performed by the second vehicle, update risk information associated with the license plate information of the license plate attached to the second vehicle and stored in the risk database; and determine a risk score associated with the license plate information of the license plate attached to the second vehicle based on the updated risk information; and store the risk score in association with the license plate information in the risk database.

In further features, the risk module is further configured to: wirelessly receive a second report from mobile device, the second report including: the license plate information of the license plate attached to the second vehicle; and a predetermined type of second driving maneuver performed by the second vehicle; based on the predetermined type of second driving maneuver performed by the second vehicle, update the risk information associated with the license plate information of the license plate attached to the second vehicle and stored in the risk database; and determine the risk score associated with the license plate information of the license plate attached to the second vehicle based on the updated risk information; and store the risk score in association with the license plate information in the risk database.

In further features, a response module is configured to: wirelessly receive, from a third vehicle, a request including the license plate information of the license plate attached to the second vehicle; based on the license plate information of the license plate attached to the second vehicle included in the request, determine the risk score associated with the license plate information stored in the risk database; and wirelessly communicate a response including the risk score of the second vehicle to the third vehicle.

In further features: the request further includes a location of the third vehicle, and the server further includes: a reported vehicle database; and a reporting module configured to: determine whether the license plate information of the license plate attached to the second vehicle is included in the reported vehicle database; and in response to determining that the license plate information of the license plate attached to the second vehicle is included in the reported vehicle database, transmit a report to a governmental regulatory body, the report including the location of the third vehicle and the license plate information of the license plate attached to the second vehicle.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 7 is a functional block diagram of an example implementation of a risk server;

In the drawings, reference numbers may be reused to identify similar and/or identical elements.

DETAILED DESCRIPTION

A vehicle may include a perception system that perceives objects located around the vehicle based on data from external cameras and sensors. Examples of external cameras include forward facing cameras, rear facing cameras, and side facing cameras. External sensors include radar sensors, light detection and ranging (LIDAR) sensors, and other types of sensors.

For example, a camera may capture an image including a second vehicle bearing a license plate. One or more of the images may indicate that the vehicle performed one or more predetermined types of driving maneuvers, such as changing lanes without signaling, turning without signaling, colliding with an object (e.g., another vehicle), etc.

According to the present disclosure, the vehicle may generate reports indicative of driving of other vehicles and the other vehicles' respective license plate information. For example, the vehicle may generate a report including another vehicles license plate information and a type of driving maneuver performed when the other vehicle changes lanes without signaling, turns without signaling, or collides with an object.

The vehicle transmits reports to a remote server. Reports from vehicles can be automatically sent by the vehicle or sent in response to user input to an application executed by the vehicle (e.g., infotainment module). Mobile devices (e.g., cellular phones) may also transmit reports to the remote server based on driving of vehicles. The reports generated by mobile devices also include license plate information of vehicles and the driving maneuvers performed by the vehicles, respectively. Based on the reports received regarding a license plate, the server determines a risk score associated with that license plate.

The vehicle may selectively transmit, to the server, requests for information regarding driving of vehicles including license plates visible in images captured by cameras of the vehicle. The server may determine the risk scores associated with the license plates of the requests and transmit the responses including the risk scores to the vehicle. The vehicle may take one or more actions based on one or more of the risk scores, such as steer the vehicle, adjust a following distance, brake, decelerate, change route or select a different route, etc. Additionally or alternatively, the vehicle may display information regarding the risk scores on a display of the vehicle.

Figure 1:
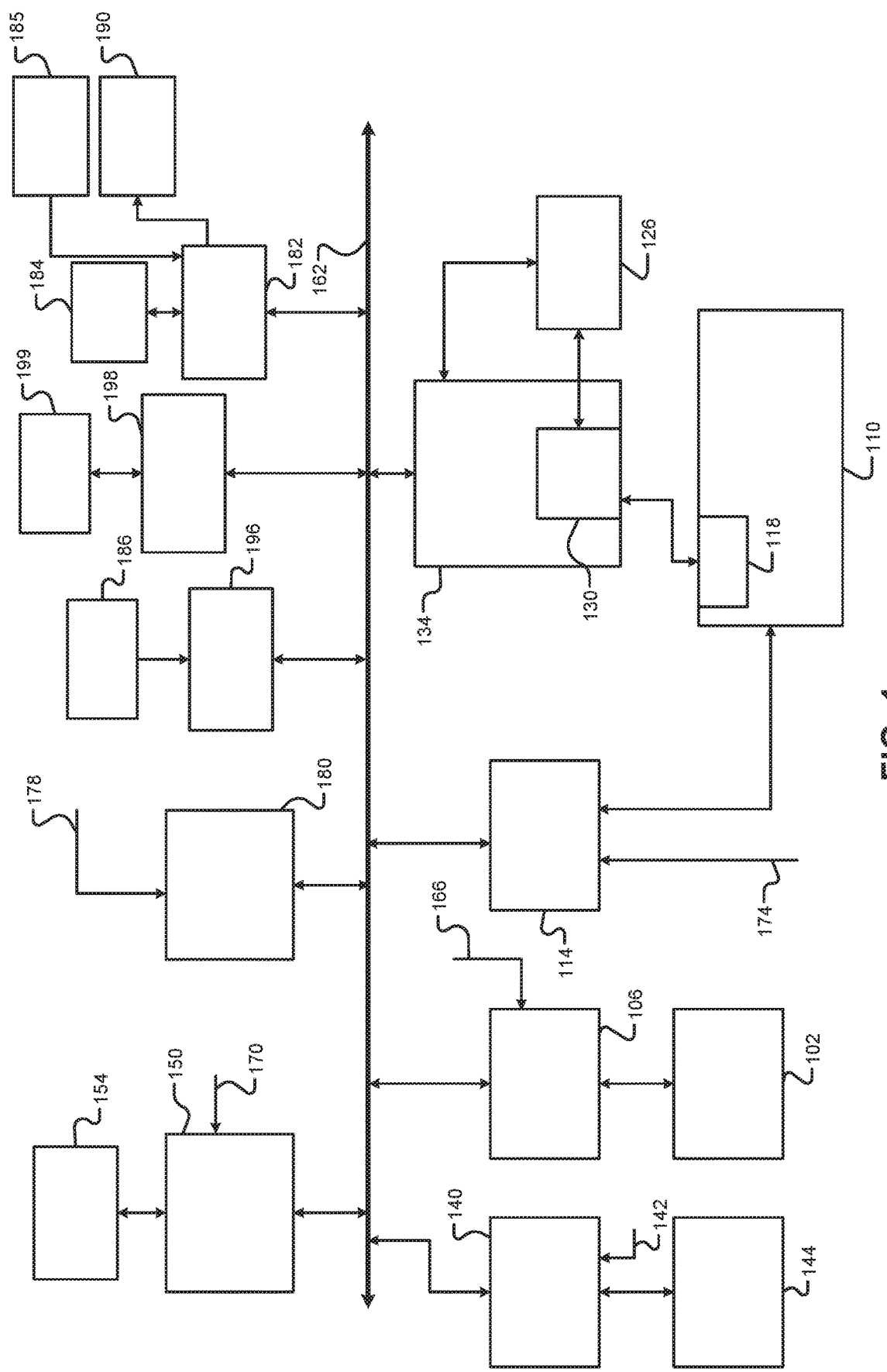
FIG. 1 is a functional block diagram of an example vehicle system.

Referring now to FIG. 1, a functional block diagram of an example vehicle system is presented. While a vehicle system for a hybrid vehicle is shown and will be described, the present disclosure is also applicable to non-hybrid vehicles, electric vehicles, fuel cell vehicles, autonomous vehicles, and other types of vehicles. Also, while the example of a vehicle is provided, the present application is also applicable to non-vehicle implementations, such as traffic monitoring systems.

An engine 102 may combust an air/fuel mixture to generate drive torque. An engine control module (ECM) 106 controls the engine 102 based on driver inputs and/or one or more other torque requests/commands from one or more vehicle control modules. For example, the ECM 106 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators. In some types of vehicles (e.g., electric vehicles), the engine 102 may be omitted.

The engine 102 may output torque to a transmission 110. A transmission control module (TCM) 114 controls operation of the transmission 110. For example, the TCM 114 may control gear selection within the transmission 110 and one or more torque transfer devices (e.g., a torque converter, one or more clutches, etc.).

The vehicle system may include one or more electric motors. For example, an electric motor 118 may be implemented within the transmission 110 as shown in the example of FIG. 1. An electric motor can act as either a generator or as a motor at a given time. When acting as a generator, an electric motor converts mechanical energy into electrical energy. The electrical energy can be, for example, used to charge a battery 126 via a power control device (PCD) 130. When acting as a motor, an electric motor generates torque that may be used, for example, to supplement or replace torque output by the engine 102. While the example of one electric motor is provided, the vehicle may include zero or more than one electric motor.

A power inverter control module (PIM) 134 may control the electric motor 118 and the PCD 130. The PCD 130 applies power from the battery 126 to the electric motor 118 based on signals from the PIM 134, and the PCD 130 provides power output by the electric motor 118, for example, to the battery 126. The PIM 134 may be referred to as a power inverter module (PIM) in various implementations.

A steering control module 140 controls steering/turning of wheels of the vehicle, for example, based on driver turning of a steering wheel within the vehicle and/or steering commands from one or more vehicle control modules. A steering wheel angle sensor (SWA) monitors rotational position of the steering wheel and generates a SWA 142 based on the position of the steering wheel. As an example, the steering control module 140 may control vehicle steering via an EPS motor 144 based on the SWA 142. However, the vehicle may include another type of steering system.

An electronic brake control module (EBCM) 150 may selectively control brakes 154 of the vehicle based on the driver inputs and/or one or more other braking requests/commands from one or more vehicle control modules.

Modules of the vehicle may share parameters via a network 162, such as a controller area network (CAN). The CAN may also be referred to as a car area network. For example, the network 162 may include one or more data buses. Various parameters may be made available by a given control module to other control modules via the network 162.

The driver inputs may include, for example, an accelerator pedal position (APP) 166 which may be provided to the ECM 106. A brake pedal position (BPP) 170 may be provided to the EBCM 150. A position 174 of a park, reverse, neutral, drive lever (PRNDL) may be provided to the TCM 114. An ignition state 178 may be provided to a body control module (BCM) 180. For example, the ignition state 178 may be input by a driver via an ignition key, button, or switch. At a given time, the ignition state 178 may be one of off, accessory, run, or crank.

The vehicle system may also include an infotainment module 182. The infotainment module 182 controls what is displayed on a display 184. The display 184 may be a touchscreen display in various implementations and transmit signals indicative of user input to the display 184 to the infotainment module 182. The infotainment module 182 may additionally or alternatively receive signals indicative of user input from one or more other user input devices 185, such as one or more switches, buttons, knobs, etc. The infotainment module 182 may also generate output via one or more other devices. For example, the infotainment module 182 may output sound via one or more speakers 190 of the vehicle.

The vehicle may include a plurality of external sensors and cameras, generally illustrated in FIG. 1 by 186. One or more actions may be taken based on input from the external sensors and cameras 186. For example, the infotainment module 182 may display video, various views, and/or alerts on the display 184 based on input from the external sensors and cameras 186.

As another example, based on input from the external sensors and cameras 186, a perception module 196 perceives objects around the vehicle. The perception module 196 may monitor driving of other vehicles and identify license plate information (unique letter and/or number combinations) of other vehicles based on input from the external sensors and cameras 186. Based on the monitoring of driving of the other vehicles, the perception module 196 may detect the occurrence of predetermined types of events by other vehicles, such as causing an accident, changing lanes without signaling a lane change, and other types of events.

The ECM 106 may adjust torque output of the engine 102 based on input from the perception module 196. Additionally or alternatively, the PIM 134 may control power flow to and/or from the electric motor 118 based on input from the perception module 196. Additionally or alternatively, the EBCM 150 may adjust braking based on input from the perception module 196. Additionally or alternatively, the steering control module 140 may adjust steering based on input from the perception module 196.

The vehicle includes a communication module 198 that wirelessly communicates with remote devices, such as a risk server, as discussed below. The communication module 198 wirelessly transmits and receives data via one or more antennas, such as antenna 199.

The vehicle may include one or more additional control modules that are not shown, such as a chassis control module, a battery pack control module, etc. The vehicle may omit one or more of the control modules shown and discussed.

Figure 2:
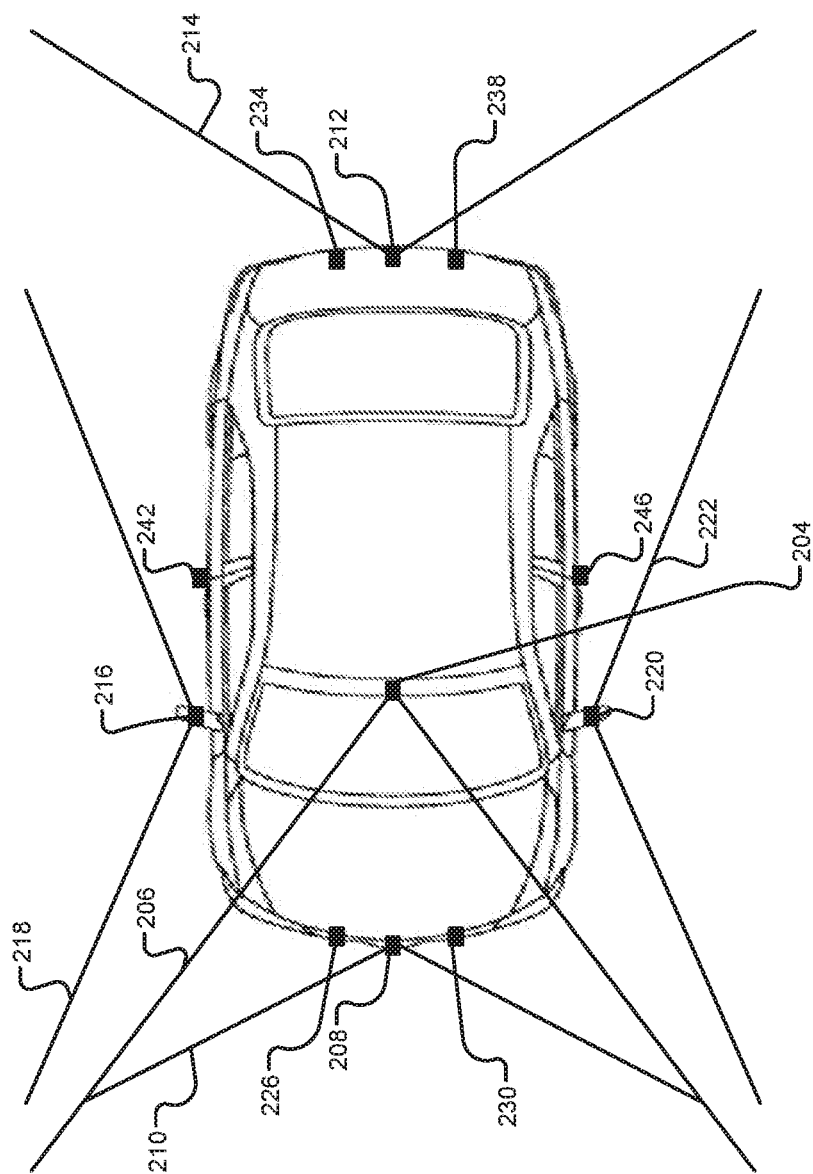
FIG. 2 is a functional block diagram of a vehicle including various external cameras and sensors.

Referring now to FIG. 2, a functional block diagram of a vehicle including examples of external sensors and cameras is presented. The external sensors and cameras 186 include various cameras positioned to capture images and video outside of (external to) the vehicle and various types of sensors measuring parameters outside of (external to the vehicle). For example, a forward facing camera 204 captures images and video of images within a predetermined field of view (FOV) 206 in front of the vehicle.

A front camera 208 may also capture images and video within a predetermined FOV 210 in front of the vehicle. The front camera 208 may capture images and video within a predetermined distance of the front of the vehicle and may be located at the front of the vehicle (e.g., in a front fascia, grille, or bumper). The forward facing camera 204 may be located more rearward, however, such as with a rear view mirror at a windshield of the vehicle. The forward facing camera 204 may not be able to capture images and video of items within all of or at least a portion of the predetermined FOV of the front camera 208 and may capture images and video that is greater than the predetermined distance of the front of the vehicle. In various implementations, only one of the forward facing camera 204 and the front camera 208 may be included.

A rear camera 212 captures images and video within a predetermined FOV 214 behind the vehicle. The rear camera 212 may capture images and video within a predetermined distance behind vehicle and may be located at the rear of the vehicle, such as near a rear license plate.

A right camera 216 captures images and video within a predetermined FOV 218 to the right of the vehicle. The right camera 216 may capture images and video within a predetermined distance to the right of the vehicle and may be located, for example, under a right side rear view mirror. In various implementations, the right side rear view mirror may be omitted, and the right camera 216 may be located near where the right side rear view mirror would normally be located.

A left camera 220 captures images and video within a predetermined FOV 222 to the left of the vehicle. The left camera 220 may capture images and video within a predetermined distance to the left of the vehicle and may be located, for example, under a left side rear view mirror. In various implementations, the left side rear view mirror may be omitted, and the left camera 220 may be located near where the left side rear view mirror would normally be located. While the example FOVs are shown for illustrative purposes, the FOVs may overlap, for example, for more accurate and/or inclusive stitching.

The external sensors and cameras 186 may additionally or alternatively include various other types of sensors, such as ultrasonic (e.g., radar) sensors. For example, the vehicle may include one or more forward facing ultrasonic sensors, such as forward facing ultrasonic sensors 226 and 230, one or more rearward facing ultrasonic sensors, such as rearward facing ultrasonic sensors 234 and 238. The vehicle may also include one or more right side ultrasonic sensors, such as right side ultrasonic sensor 242, and one or more left side ultrasonic sensors, such as left side ultrasonic sensor 246. The locations of the cameras and ultrasonic sensors are provided as examples only and different locations could be used. Ultrasonic sensors output ultrasonic signals around the vehicle.

The external sensors and cameras 186 may additionally or alternatively include one or more other types of sensors, such as one or more sonar sensors, one or more radar sensors, and/or one or more light detection and ranging (LIDAR) sensors.

Figure 3:
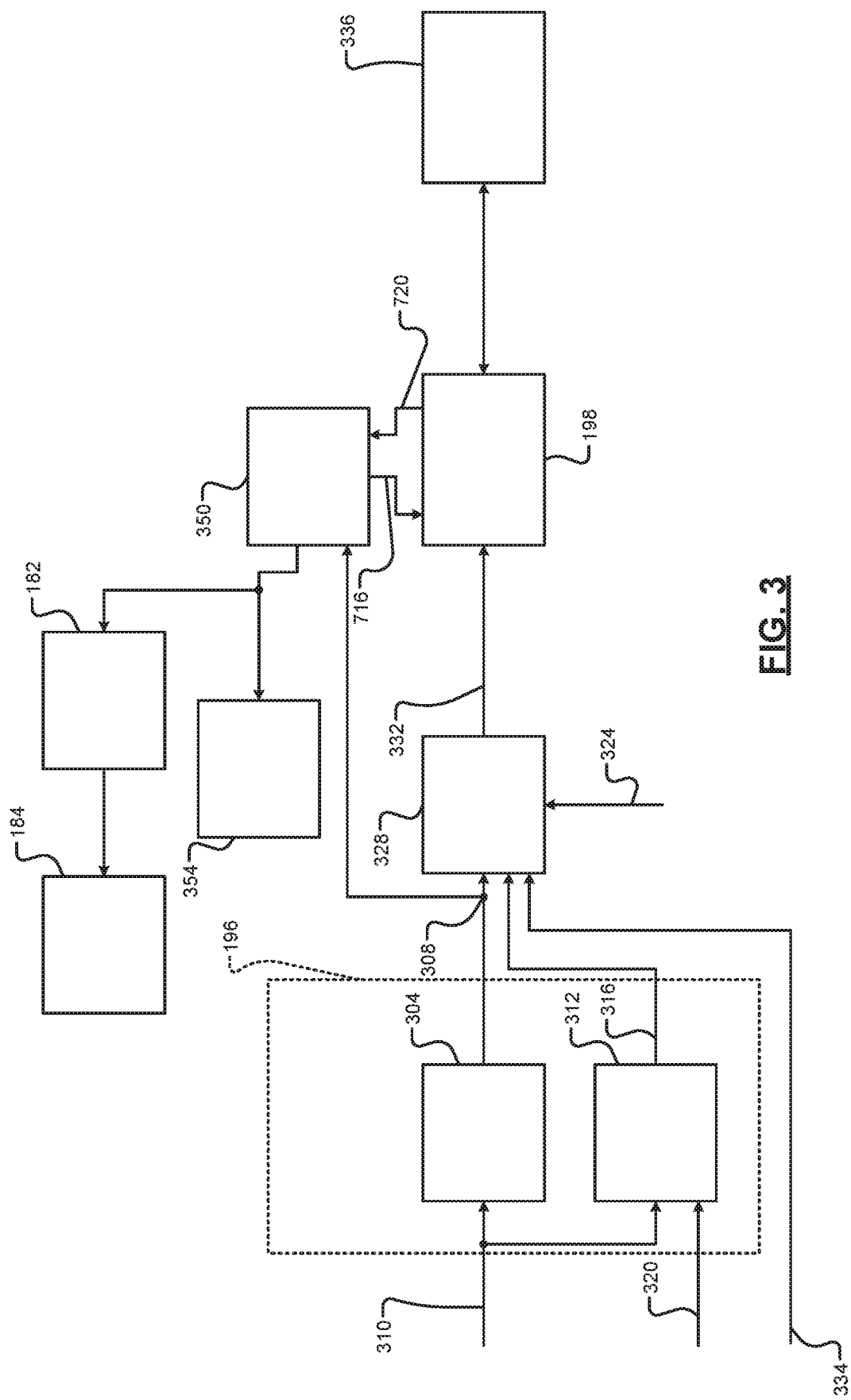
FIG. 3 is a functional block diagram of an example implementation of a perception module.

FIG. 3 is a functional block diagram of an example implementation of the perception module 196. Based on the output 310 of one or more of the external sensors and cameras 186, a license plate module 304 determines license plate information 308 for another vehicle located at least one of in front of, beside, and behind the vehicle. The license plate information 308 includes, for example, a state, letters, numbers, and/or other characters present on a license plate of the other vehicle. The license plate module 304 may determine the license plate information 308, for example, using optical character recognition on an image taken using a camera of the vehicle or in another suitable manner. In various implementations, the license plate module 304 may determine the license plate information 308 for each vehicle having a license plate that is visible to the vehicle and that is within a predetermined distance of the vehicle. The license plate module 304 may obtain the license plate information 308 in another manner, such as via a vehicle to vehicle (V2V) connection.

An event module 312 monitors the driving of the other vehicle (associated with the license plate information 308) and selectively outputs an event indicator 316 based on the driving of the other vehicle. The event indicator 316 includes a type of maneuver performed by the other vehicle. The event indicator 316 may also include a number of times the predetermined maneuver was performed, a severity of the predetermined maneuver performed, and other information.

For example, the event module 312 may output the event indicator 316 when the other vehicle changes lanes without signaling a lane change (via signal lights). As another example, the event module 312 may output the event indicator 316 when the other vehicle turns without signaling a turn (via signal lights). As another example, the event module 312 may output the event indicator 316 when the other vehicle contacts another object, such as another vehicle, cyclist, pedestrian, wall, etc. The event module 312 may identify the occurrence of an event prompting the output of the event indicator 316 based on the output of one or more of the external sensors and cameras 186. The event module 312 monitors the driving of the other vehicle using the output of the external sensors and cameras 186.

The event module 312 may also monitor the driving of the vehicle and selectively outputs the event indicator 316 based on the driving of the vehicle. For example, the event module 312 may monitor parameters 320 of the vehicle and the output of one or more of the external sensors and cameras 186. The event module 312 may selectively output the event indicator 316 based on one or more of the parameters 320 and the output of one or more of the external sensors and cameras 186. In this example, the event indicator 316 includes a type of maneuver performed by the vehicle.

For example, the event module 312 may output the event indicator 316 when the vehicle changes lanes without signaling a lane change (via signal lights). One of the vehicle parameters 320 may indicate whether signaling was performed in the direction of the lane change. The event module 312 may determine that the vehicle changed lanes based on the output of one or more of the external cameras and sensors 186. As another example, the event module 312 may output the event indicator 316 when the other vehicle turns without signaling a turn (via signal lights). One of the vehicle parameters 320 may indicate whether signaling was performed in the direction of the turn. The event module 312 may determine that the vehicle turned based on the output of one or more of the external cameras and sensors 186. As another example, the event module 312 may output the event indicator 316 when the vehicle contacts another object, such as another vehicle, cyclist, pedestrian, barrier, etc. One of the vehicle parameters 320 may indicate whether the vehicle contacted another object. Additionally or alternatively, the event module 312 may determine that the vehicle contacted another object based on the output of one or more of the external cameras and sensors 186.

In various implementations, a user (e.g., owner) of the vehicle may opt into or opt out of the event module 312 generating the event indicator 316 based on the driving of the vehicle (self-reporting). The event module 312 may only generate the event indicator 316 based on the driving of the vehicle once user input has been received indicative of opting into the monitoring of the driving of the vehicle. The event module 312 may not generate the event indicator 316 based on the driving of the vehicle if no input has been received regarding opting in or user input indicative of opting out has been received.

License plate information 324 of the vehicle is stored in memory of the vehicle. The license plate information 324 includes, for example, a state, letters, numbers, and/or other characters present on a license plate of the vehicle. A user may input the license plate information 324 or the license plate information 324 may be obtained, for example, using OCR based on the output of one or more of the external cameras and sensors 186.

A reporting module 328 outputs a report 332 when the event indicator 316 is generated. In the example of the other vehicle performing the maneuver prompting the event indicator 316, the report 332 includes the license plate information 308 of the other vehicle and the event indicator 316.

In the example of the vehicle performing the maneuver prompting the event indicator 316, the report 332 includes the license plate information 324 of the vehicle and the event indicator 316. The report 332 also includes a unique identifier of the vehicle that generated the report 332, such as a vehicle identification number (VIN) of the vehicle. The report 332 may also include a location 334 of the vehicle. A global position system (GPS) of the vehicle may track and provide the (present) location 334. The report 332 may also include one or more images captured of the other vehicle.

The reporting module 328 communicates the report 332 to a risk server 336 that is located remotely from the vehicle. For example, the reporting module 328 may communicate the report 332 to the communication module 198 and the communication module 198 may wirelessly transmit the report 332 to the risk server 336, such as via a cellular, satellite, or WiFi connection.

Figure 4:
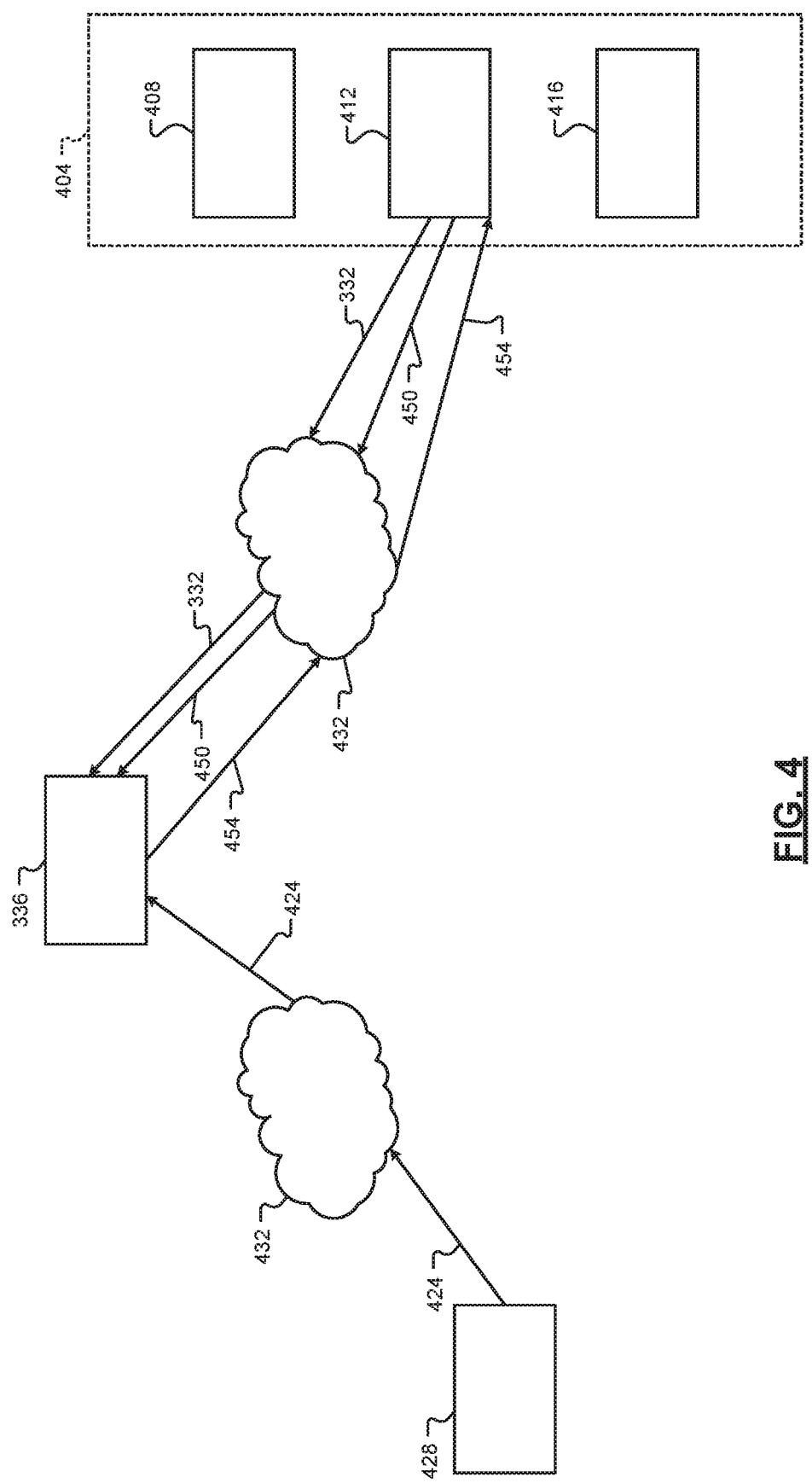
FIG. 4 is a functional block diagram of an example risk system.

FIG. 4 is a functional block diagram of an example risk system including the risk server 336. The risk server 336 receives reports, such as the report 332, from a plurality of vehicles 404, such as vehicle 408, vehicle 412, vehicle 416, and a plurality of other vehicles. The vehicles 404 may include autonomous vehicles, non-autonomous (driver driven) vehicles, semi-autonomous vehicles, or a combination of autonomous and non-autonomous vehicles.

The risk server 336 also receives reports, such as report 424, from mobile devices, such as mobile device 428. Examples of mobile devices include mobile phones, tablet devices, laptop computers, desktop computers, and other types of computing devices. Mobile devices, vehicles, and the risk server 336 communicate via one or more networks 432. The networks 432 may include wireless networks or a combination of wireless and wired networks.

The risk server 336 determines risks of various vehicles. A vehicle may adjust its operation based on the risk of one or more vehicles around that vehicle. Additionally or alternatively, the vehicle may display the risk of one or more vehicles around that vehicle on a display.

Figure 6:
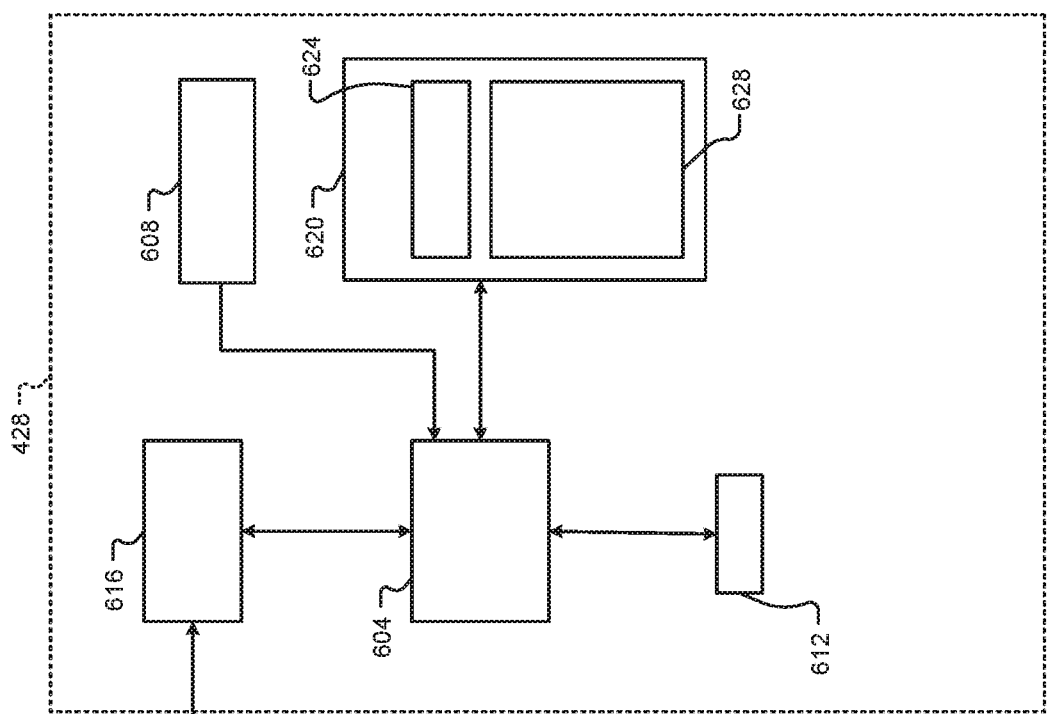
FIG. 6 is a functional block diagram of an example implementation of a computing device.
Figure 5:
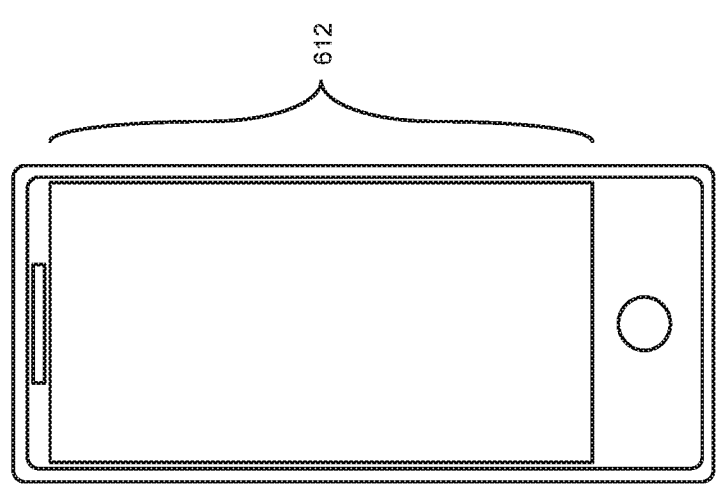
FIG. 5 is a front view of an example implementation of a computing device.

FIG. 5 includes a front view of an example implementation of the mobile device 428. FIG. 6 includes a functional block diagram of an example implementation of the mobile device 428. Referring to FIGS. 5 and 6, the mobile device 428 includes a central processing unit (CPU) or processor 604, one or more input devices 608 (e.g., touchscreen display, a microphone, one or more switches, etc.), a display 612 (e.g., the touchscreen display), one or more other output devices (not shown), a network interface 616, and memory 620. While the input devices 608 and the display 612 are illustrated as components of the mobile device 428, input devices and output devices (e.g., a display) may be peripheral devices. Also, while the example of a single processor is provided, the mobile device 428 may include two or more processors.

The network interface 616 connects the mobile device 428 to the networks 432. For example, the network interface 616 may include a wired interface (e.g., an Ethernet interface) and/or a wireless interface (e.g., a WiFi, Bluetooth, near field communication (NFC), or other wireless interface). The processor 604 of the mobile device 428 executes an operating system (OS) 624 and one or more other applications. The processor 604 executes a reporting application 628 to display user interfaces for generating and transmitting reports including event indicators and license plates of vehicles. Operations discussed herein as being performed by the mobile device 428 are performed by the mobile device 428 (more specifically the processor 604) during execution of the reporting application 628. Another instance of the reporting application may be executed in vehicle, for example, within and by the infotainment module 182. The infotainment module 182 may use user input to the display 184 and/or the one or more user input devices 185 to generate reports using that reporting application.

The mobile device 428 generates reports based on user input and transmits the reports to the risk server 336. Each of the reports includes license plate information and an event indicator. The license plate information includes a state, letters, numbers, and/or other characters present on a license plate of a vehicle. A user may input the license plate information 324 to the mobile device 428 or the license plate information may be obtained, for example, using OCR based on an image captured using a camera of the mobile device 428. The event indicator includes a type of maneuver performed by the vehicle associated with the license plate information 324. The event indicator may also include a number of times the predetermined maneuver was performed, a severity of the predetermined maneuver performed, and other information. The type of maneuver performed may be selected by a user from a predetermined list of maneuvers. Each report also includes a unique identifier of the mobile device that generated the report.

Referring back to FIG. 4, the risk server 336 determines risks of various vehicles based on the reports 332 from vehicles and the reports 424 from mobile devices.

FIG. 7 includes a functional block diagram of an example implementation of the risk server 336. A risk module 704 receives the reports from vehicles and mobile devices, such as the report 332 and the report 424. The risk module 704 updates a risk database 708 and determines risk scores (values) for vehicles identified in the reports based on the information included in the reports.

The risk database 708 may include risk data indexed by license plate. The risk data associated with each license plate may include, for example, a count of number of reports of each different type of maneuver within the last predetermined period, a count of a number of reports generated by the vehicle associated with the license plate in the last predetermined period, a count of a number of reports generated by other devices (vehicles and/or mobile devices) in the last predetermined period, a count of a number of unique devices that reported the license plate in the last predetermined period, a number of collisions by the vehicle associated with the license plate with objects in the last predetermined period, and/or other event information associated with the license plate in the last predetermined period. The predetermined period may be, for example, 6 months, 1 year, or another suitable period.

The risk module 704 determines a risk score for each license plate based on the risk data associated with that license plate in the risk database 708. The risk module 704 may increase the risk score for a license plate as the number of driving maneuvers reported within the last predetermined period for that license plate increase and vice versa. The risk module 704 may determine the risk score for a license plate using one of a lookup table and an equation that relates parameters of the risk data and weighting values to risk scores. For example, the risk module 704 may determine the risk score for a license plate using the equation:

$$\text{Risk} = \Sigma(w1*p1 + w2*p2 + w3*p3 \ldots + Wn*pn),$$

where Risk is the risk score of the license plate, w1 is a first weighting value, p1 is a first parameter of the risk data associated with the license plate, w2 is a second weighting value, p2 is a second parameter of the risk data associated with the license plate, w3 is a third weighting value, p3 is a third parameter of the risk data associated with the license plate, wn is an n-th weighting value, and pn is an n-th parameter of the risk data associated with the license plate. The weighting values may be fixed predetermined values or may be variables. The first parameter may be, for example, a count of number of reports of a first type of maneuver within the last predetermined period. The second parameter may be, for example, a count of number of reports of a second type of maneuver within the last predetermined period. The third parameter may be, for example, the count of a number of reports generated by the vehicle associated with the license plate. A fourth parameter may be, for example, the count of a number of reports generated by other devices (vehicles and/or mobile devices). A fifth parameter may be, for example, the count of a number of unique devices that reported the license plate. A sixth parameter may be, for example, the number of collisions by the vehicle associated with the license plate with objects, etc. While two types of maneuvers are described above, the equation or lookup table may account for more than two types of maneuvers.

As shown in FIG. 4, vehicles may selectively transmit requests 450 to the risk server 336. Each of the requests 450 may include the license plate information 308 for each vehicle having a license plate that is visible to the vehicle and that is within the predetermined distance of the vehicle. Each vehicle may generate a request at a predetermined rate, such as each predetermined period (e.g., 5 seconds, 10 seconds, 15 seconds, etc.) or each predetermined distance (e.g., 500 feet, 1000 feet, etc.). For example, as shown in FIG. 3, a risk obtaining module 350 may transmit a request 716 including the license plate information 308 and the location of the vehicle.

As shown in FIG. 7, a response module 712 receives the requests 450, such as the request 716. The request 716 includes one or more pieces of the license plate information for one or more different vehicles, respectively. The response module 712 obtains the respective risk scores associated with the license plate information from the risk database 708. The response module 712 transmits a response 720 back to the vehicle that transmitted the request 716. The response 720 includes the risk scores of the respective vehicles bearing the license plate information included in the request 716. For example, the risk obtaining module 350 receives the response 720 to the request 716 in the example of FIG. 3.

The vehicle receiving the response 720 may take one or more actions based on one or more of the risk scores. For example, the infotainment module 182 may display video, various views, and/or alerts on the display 184 when one or more of the risk scores are greater than a predetermined value. As another example, one or more control modules 354 may actuate one or more actuators based on one or more of the risk scores of the response 720.

For example, the ECM 106 may adjust torque output of the engine 102 based on one or more of the risk scores. For example, the ECM 106 may adjust torque output of the engine 102 to maintain at least a predetermined distance between a vehicle having a risk score that is greater than a predetermined value and the vehicle. Additionally or alternatively, the PIM 134 may control power flow to and/or from the electric motor 118 based on one or more of the risk scores. For example, the PIM 134 may control power flow to and/or from the electric motor 118 to maintain at least a predetermined distance between a vehicle having a risk score that is greater than a predetermined value and the vehicle. Additionally or alternatively, the EBCM 150 may adjust braking based on one or more of the risk scores. For example, the EBCM 150 may adjust braking to maintain at least a predetermined distance between a vehicle having a risk score that is greater than a predetermined value and the vehicle. Additionally or alternatively, the steering control module 140 may adjust steering based on one or more of the risk scores. For example, the steering control module 140 may adjust steering to maintain at least a predetermined distance between a vehicle having a risk score that is greater than a predetermined value and the vehicle. Example responses are illustrated by 454 in FIG. 4.

The risk server 336 may also include a reporting module 724 and a reported vehicle database 728. The reporting module 724 also receives the requests 450, such as the request 716. The reporting module 724 determines whether any of the license plate information in the requests 450 is included in the reported vehicle database 728. If a piece of license plate information is included in a request, the reporting module 724 transmits a report 732 to one or more governmental regulatory bodies, such as one or more police departments. The report 732 includes the license plate information included in the reported vehicle database 728 and the location provided with that license plate information in that request.

The reported vehicle database 728 may include license plate information reported by the one or more governmental regulatory bodies and/or license plate information reported by one or more other sources. Other examples of license plate information that may be included in the reported vehicle database 728 includes license plate information included in amber alerts, license plate information of stolen vehicles, license plate information associated with drivers having one or more warrants, etc. Based on the report 732, the one or more governmental regulatory bodies may respond to the approximate location of the vehicle to identify the vehicle including the license plate information included in the reported vehicle database 728.

Figure 8:
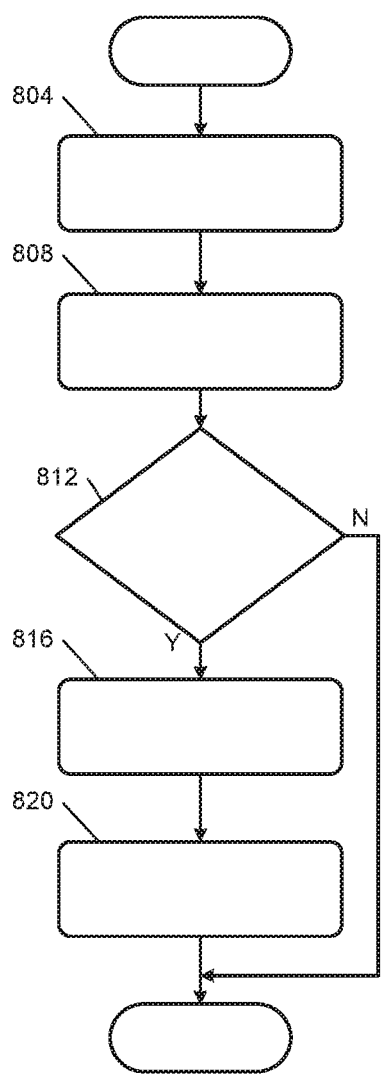
FIG. 8 includes a flowchart depicting an example method of a vehicle generating reports regarding driving of other vehicles.

FIG. 8 includes a flowchart depicting an example method of generating reports regarding driving of other vehicles. Control begins with 804 where the external cameras and sensors 186 capture information outside of the vehicle. At 808, the license plate module 304 determines the license plate information 308 based on the output of one or more of the external cameras and sensors 186, such as the forward facing camera 204. In various information, the license plate module 304 may obtain the license plate information 308 in another manner, such as via a V2V connection. At 812, based on the output of the external cameras and sensors 186, the event module 312 determines whether one or more other vehicles performed one or more of the predetermined types of maneuvers. If 812 is false, control may end. If 812 is true, control may continue with 816.

At 816, the reporting module 328 generates the report for the maneuver performed by the other vehicle. The report 332 includes the license plate information 308 of the other vehicle, the maneuver performed by the other vehicle, the location of the vehicle, and may include other information. At 820, the communication module 198 transmits the report 332 to the risk server 336 for updating the risk score associated with the other vehicle. While control is shown as ending, control may return to 804.

Figure 9:
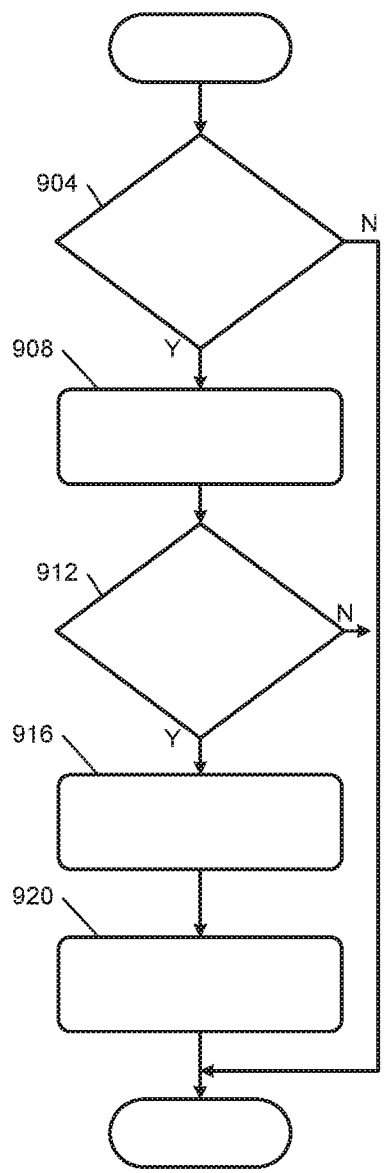
FIG. 9 includes a flowchart depicting an example method of a vehicle generating reports regarding its driving.

FIG. 9 includes a flowchart depicting an example method of generating reports regarding driving of the vehicle (self-reporting). Control may begin with 904 where the reporting module 328 determines whether the vehicle has been opted into self-reporting. An indicator (e.g., flag) may be stored in memory that indicated whether the vehicle has been opted into self-reporting. If 904 is true, control may continue with 908. If 904 is false, control may end. In various implementations, 904 may be omitted.

At 908, the event module 312 obtains the vehicle parameters 320 and the output of the external cameras and sensors 186. At 912, based on the vehicle parameters 320 and the output of the external cameras and sensors 186, the event module 312 determines whether the vehicle performed one or more of the predetermined types of maneuvers. If 912 is false, control may end. If 912 is true, control may continue with 916.

At 916, the reporting module 328 generates the report for the maneuver performed by the vehicle. The report 332 includes the license plate information 324 of the vehicle, the maneuver performed by the vehicle, the location of the vehicle, and may include other information. At 920, the communication module 198 transmits the report 332 to the risk server 336 for updating the risk score associated with the vehicle. While control is shown as ending, control may return to 904.

Figure 10:
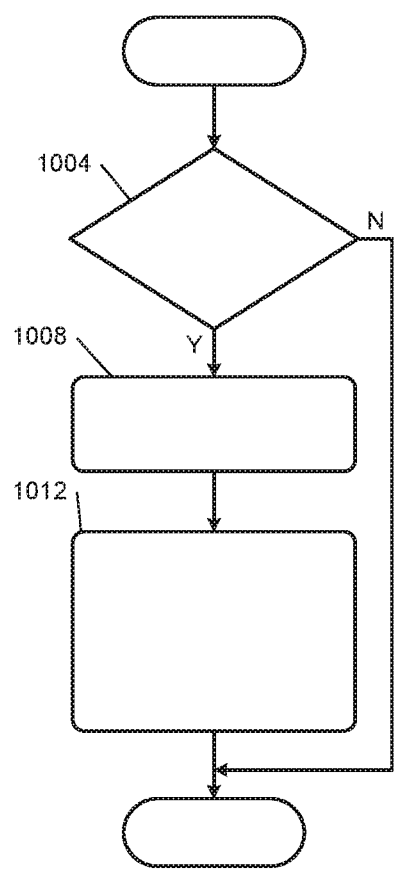
FIG. 10 includes a flowchart depicting an example method of updating a risk database.

FIG. 10 is a flowchart depicting an example method of updating the risk database 708. Control may begin with 1004 where the risk module 704 receives a report, such as a report regarding a maneuver performed by another vehicle or a report regarding a maneuver performed by the vehicle. If 1004 is true, control continues with 1008. If 1004 is false, control may end.

At 1008, the risk module 704 determines the license plate information for the vehicle that performed the maneuver from the received report. At 1012, the risk module 704 identifies the risk data associated with the license plate information stored in the risk database 708, updates the risk data based on the information included in the received report, and updates the risk score associated with the license plate information in the risk database 708. Control may then end. While control is shown as ending, control may return to 1004.

Figure 11:
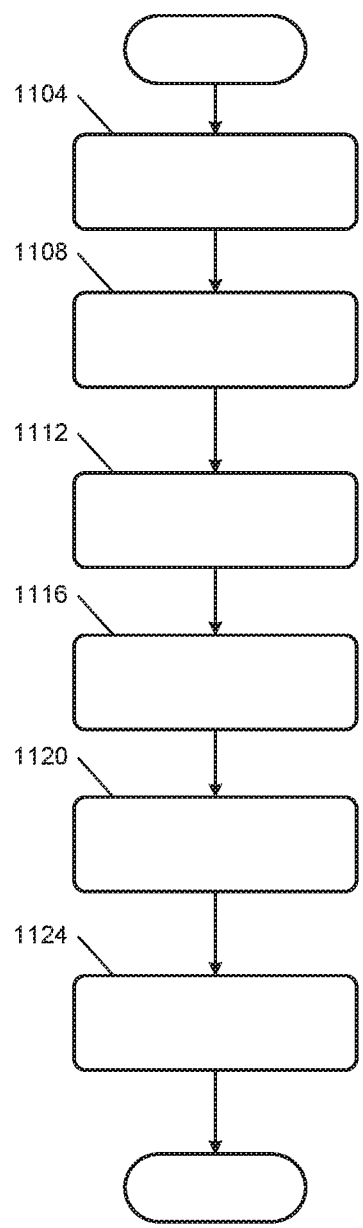
FIG. 11 includes a flowchart depicting an example method of capturing license plate information of other vehicles around a vehicle and taking one or more actions based on risk scores associated with the other vehicles.

FIG. 11 includes a flowchart depicting an example method of capturing license plate information of other vehicles around a vehicle and taking one or more actions based on risk scores associated with the other vehicles. Control begins with 1104 where the external cameras and sensors 186 capture information outside of the vehicle. At 1108, the license plate module 304 determines the license plate information 308 for the other vehicles based on the output of the external cameras and sensors 186.

At 1112, the risk obtaining module 350 generates the request 716 for risk scores of the other vehicles associated with the license plate information 308. At 1116, the communication module 198 transmits the request 716 to the risk server 336. The risk server 336 obtains the risk scores for the other vehicles based on the license plate information 308 from the risk database 708, and generates the response 720 based on the risk scores.

At 1120, the risk obtaining module 350 receives the response 720 regarding the other vehicles from the risk server 336 via the communication module 198. At 1124, the vehicle takes one or more actions based on the risk scores. For example, the infotainment module 182 may display video, various views, and/or alerts on the display 184 when one or more of the risk scores are greater than greater than a predetermined value. As another example, the ECM 106 may adjust torque output of the engine 102 based on one or more of the risk scores. For example, the ECM 106 may adjust torque output of the engine 102 to maintain at least a predetermined distance between a vehicle having a risk score that is greater than a predetermined value and the vehicle. Additionally or alternatively, the PIM 134 may control power flow to and/or from the electric motor 118 based on one or more of the risk scores. For example, the PIM 134 may control power flow to and/or from the electric motor 118 to maintain at least a predetermined distance between a vehicle having a risk score that is greater than a predetermined value and the vehicle. Additionally or alternatively, the EBCM 150 may adjust braking based on one or more of the risk scores. For example, the EBCM 150 may adjust braking to maintain at least a predetermined distance between a vehicle having a risk score that is greater than a predetermined value and the vehicle. Additionally or alternatively, the steering control module 140 may adjust steering based on one or more of the risk scores. For example, the steering control module 140 may adjust steering to maintain at least a predetermined distance between a vehicle having a risk score that is greater than a predetermined value and the vehicle. While control is shown as ending, control may return to 1104.

Figure 12:
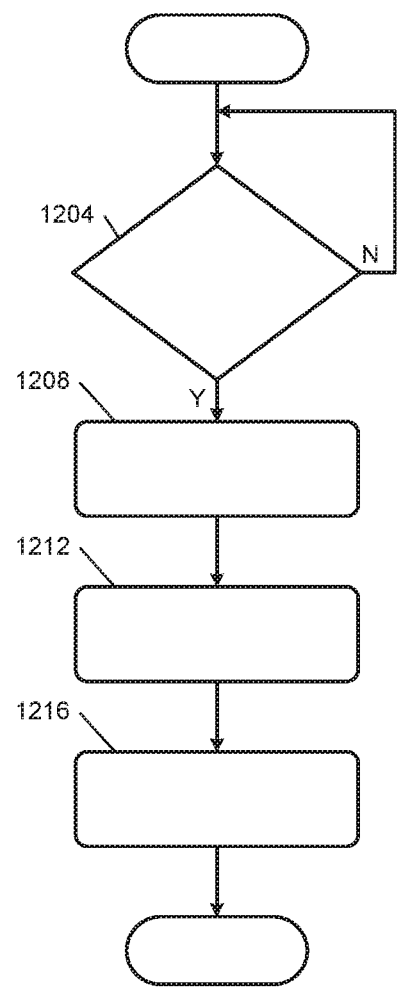
FIG. 12 includes a flowchart depicting an example method of receiving requests regarding license plate information of vehicles and responding to the requests with risk scores for the vehicles.

FIG. 12 includes a flowchart depicting an example method of receiving requests regarding license plate information of vehicles and responding to the requests with risk scores for the vehicles. Control may begin with 1204 where the response module 712 determines whether a request, such as the request 716, has been received. The request includes license plate information for one or more vehicles. If 1204 is true, control continues with 1208. If 1204 is false, control may remain at 1204.

At 1208, the response module 712 obtains (e.g., parses) the license plate information from the request. At 1212, the response module 712 determines the risk score(s) for the vehicle(s) associated with the license plate information from the risk database 708. At 1216, the response module 712 generates a response, such as the response 720, including the risk score(s) and transmits the response to the device (e.g., vehicle) that transmitted the request. While control is shown as ending, control may return to 1204.

Figure 13:
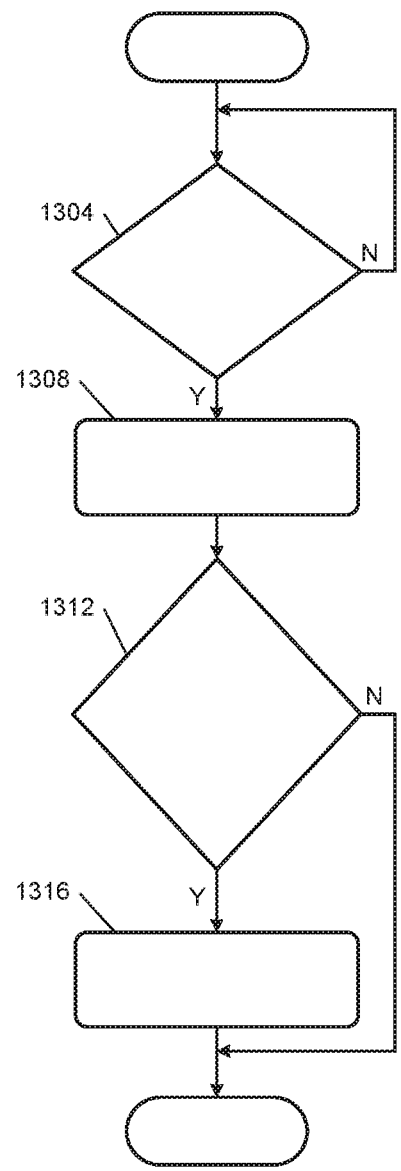
FIG. 13 includes a flowchart depicting an example method of receiving requests regarding license plate information of vehicles and selectively reporting one or more vehicles to one or more governmental regulatory bodies.

FIG. 13 includes a flowchart depicting an example method of receiving requests regarding license plate information of vehicles and selectively reporting one or more vehicles to one or more governmental regulatory bodies. Control may begin with 1304 where the reporting module 724 determines whether a request, such as the request 716, has been received. The request includes license plate information for one or more vehicles. The request also includes a location of the device (e.g., vehicle) that transmitted the request. If 1304 is true, control continues with 1308. If 1304 is false, control may remain at 1304.

At 1308, the reporting module 724 obtains (e.g., parses) the license plate information from the request. At 1312, the reporting module 724 determines whether the license plate information of one or more vehicles included in the request is present (included) in the reported vehicle database 728. If 1312 is true, control continues with 1316. If 1312 is false, the reporting module 724 does not send a report, such as the report 732, to the one or more governmental regulatory bodies, and control may end. At 1316, the reporting module 724 generates a report, such as the report 732, including the location included in the request and the license plate information of the one or more vehicles that is present in the reported vehicle database 728. The reporting module 724 transmits the report to the one or more governmental regulatory bodies at 1316, such as to one or more email, messaging, or other addresses of the governmental regulatory bodies. While control is shown as ending, control may return to 1304.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system, comprising:
    a camera of a vehicle configured to capture images within a predetermined field of view at least one of:
        in front of the vehicle;
        behind the vehicle; and
        beside the vehicle;
    a license plate circuit of the vehicle configured to determine license plate information of a license plate attached to another vehicle;
    an event circuit of the vehicle configured to:
        based on at least one of the images, determine whether the other vehicle performed a predetermined type of driving maneuver; and
        generate an indicator in response to the other vehicle performing the predetermined type of driving maneuver;
    a reporting circuit of the vehicle configured to, in response to the generation of the indicator, generate a report including:
        the license plate information of the license plate attached to the other vehicle; and
        the predetermined type of driving maneuver performed by the other vehicle;
    a communication circuit of the vehicle configured to wirelessly transmit the report to a server via at least one antenna; and
    the server, wherein the server includes a risk circuit configured to:
        receive the report;
        based on the predetermined type of driving maneuver performed by the other vehicle, update risk information associated with the license plate information of the license plate attached to the other vehicle and stored in a risk database;
        determine a risk score associated with the license plate information of the license plate attached to the other vehicle based on the updated risk information and other risk information associated with other predetermined types of driving maneuvers performed by the other vehicle; and
        store the risk score in association with the license plate information in the risk database.

2. The system of claim 1 further comprising:
    a risk obtaining circuit of the vehicle configured to generate a request including the license plate information of the license plate attached to the other vehicle,
    wherein the communication circuit is configured to wirelessly transmit the request to the server via the at least one antenna,
    wherein the server further includes a response circuit configured to:
        based on the license plate information of the license plate attached to the other vehicle included in the request, determine the risk score associated with the license plate information stored in the risk database; and
        wirelessly communicate a response including the risk score of the other vehicle to the vehicle.

3. The system of claim 2 further comprising an infotainment circuit of the vehicle configured to selectively adjust information displayed on a display of the vehicle based on the risk score of the other vehicle.

4. The system of claim 2 further comprising an engine control circuit of the vehicle configured to selectively adjust torque output of an internal combustion engine based on the risk score of the other vehicle.

5. The system of claim 2 further comprising a power inverter circuit of the vehicle configured to control torque output of an electric motor based on the risk score of the other vehicle.

6. The system of claim 2 further comprising a steering control circuit of the vehicle configured to selectively adjust steering of the vehicle based on the risk score of the other vehicle.

7. The system of claim 2 further comprising a braking control circuit of the vehicle configured to selectively adjust braking of the vehicle based on the risk score of the other vehicle.

8. The system of claim 2 further comprising an infotainment circuit of the vehicle configured to select a route for the vehicle based on the risk score of the other vehicle.

9. The system of claim 2 wherein:
the request further includes a location of the vehicle obtained from a global positioning system of the vehicle; and
the server further includes a reporting circuit configured to:
from the request, obtain the license plate information of the license plate attached to the other vehicle;
determine whether the license plate information of the license plate attached to the other vehicle is included in a reported vehicle database; and
in response to determining that the license plate information of the license plate attached to the other vehicle is included in the reported vehicle database, transmit a report to a governmental regulatory body, the report including the location of the vehicle and the license plate information of the license plate attached to the other vehicle.

10. The system of claim 2 further comprising:
a mobile device configured to:
in response to user input to the mobile device, generate a second report including:
the license plate information of the license plate attached to the other vehicle; and
a predetermined type of second driving maneuver performed by the other vehicle; and
wirelessly transmit the second report to the server.

11. The system of claim 10 wherein the risk circuit is further configured to:
receive the second report;
based on the predetermined type of second driving maneuver performed by the other vehicle, update the risk information associated with the license plate information of the license plate attached to the other vehicle and stored in the risk database;
determine the risk score associated with the license plate information of the license plate attached to the other vehicle based on the updated risk information; and
store the risk score in association with the license plate information in the risk database.

12. The system of claim 1 wherein the reporting circuit is further configured to, in response to user input to an infotainment circuit of the vehicle, generate a second report including:
the license plate information of the license plate attached to the other vehicle; and
a predetermined type of second driving maneuver performed by the other vehicle; and
wherein the communication circuit is further configured to wirelessly transmit the second report to the server via at least one antenna.

13. The system of claim 1 wherein the license plate circuit is configured to determine the license plate information using optical character recognition (OCR) based on at least one of the images.

14. A system of a vehicle, comprising:
a camera configured to capture images within a predetermined field of view at least one of:
in front of the vehicle;
behind the vehicle; and
beside the vehicle;
a license plate circuit configured to determine license plate information of a license plate attached to another vehicle;
a risk obtaining circuit configured to generate a request including the license plate information of the license plate attached to the other vehicle;
a communication circuit configured to:
wirelessly transmit the request to a server via at least one antenna; and
wirelessly receive a response that is responsive to the request from the server via at least one antenna,
wherein the response includes a risk score of the other vehicle; and
an infotainment circuit configured to select a route for the vehicle based on the risk score of the other vehicle.

15. The system of claim 14 further comprising at least one of:
a second infotainment circuit configured to selectively adjust information displayed on a display of the vehicle based on the risk score of the other vehicle;
an engine control circuit configured to selectively adjust torque output of an internal combustion engine based on the risk score of the other vehicle;
a power inverter circuit configured to control torque output of an electric motor based on the risk score of the other vehicle;
a steering control circuit configured to selectively adjust steering of the vehicle based on the risk score of the other vehicle; and
a braking control circuit configured to selectively adjust braking of the vehicle based on the risk score of the other vehicle.

16. A server comprising:
a risk database; and
a risk circuit configured to:
wirelessly receive a report from a first vehicle, the report including:
license plate information of a license plate attached to a second vehicle; and
a predetermined type of driving maneuver performed by the second vehicle;
based on the predetermined type of driving maneuver performed by the second vehicle, update risk information associated with the license plate information of the license plate attached to the second vehicle and stored in the risk database;
determine a risk score associated with the license plate information of the license plate attached to the second vehicle based on the updated risk information and other risk information associated with other predetermined types of driving maneuvers performed by the other vehicle; and store the risk score in association with the license plate information in the risk database.

17. The server of claim 16 wherein the risk circuit is further configured to:
  wirelessly receive a second report from mobile device, the second report including:
    the license plate information of the license plate attached to the second vehicle; and
    a predetermined type of second driving maneuver performed by the second vehicle;
  based on the predetermined type of second driving maneuver performed by the second vehicle, update the risk information associated with the license plate information of the license plate attached to the second vehicle and stored in the risk database;
  determine the risk score associated with the license plate information of the license plate attached to the second vehicle based on the updated risk information; and
  store the risk score in association with the license plate information in the risk database.

18. The server of claim 16 further comprising a response circuit configured to:
  wirelessly receive, from a third vehicle, a request including the license plate information of the license plate attached to the second vehicle;
  based on the license plate information of the license plate attached to the second vehicle included in the request, determine the risk score associated with the license plate information stored in the risk database; and
  wirelessly communicate a response including the risk score of the second vehicle to the third vehicle.

19. The server of claim 18 wherein:
the request further includes a location of the third vehicle, and
the server further includes:
  a reported vehicle database; and
  a reporting circuit configured to:
    determine whether the license plate information of the license plate attached to the third vehicle is included in the reported vehicle database; and
    in response to determining that the license plate information of the license plate attached to the second vehicle is included in the reported vehicle database, transmit a report to a governmental regulatory body, the report including the location of the third vehicle and the license plate information of the license plate attached to the third vehicle.

* * * * *